United States Patent
Heintz et al.

(10) Patent No.: US 11,183,873 B2
(45) Date of Patent: Nov. 23, 2021

(54) SMOOTHING OF A LOAD CURVE COMPRISING AGGREGATION OF ELEMENTARY LOAD CURVES

(71) Applicant: VOLTALIS, Paris (FR)

(72) Inventors: Bruno Heintz, Paris (FR); Mathieu Bineau, Versailles (FR); Marc Autord, Guerville (FR); Benjamin Pinard, Paris (FR); Christophe Tan, Bourg la Reine (FR); Jean Marc Oury, Paris (FR)

(73) Assignee: VOLTALIS, Paris (FR)

( * ) Notice: Subject to any disclaimer, the term of this patent is extended or adjusted under 35 U.S.C. 154(b) by 0 days.

(21) Appl. No.: 16/633,432

(22) PCT Filed: May 16, 2018

(86) PCT No.: PCT/FR2018/051179
§ 371 (c)(1),
(2) Date: Jan. 23, 2020

(87) PCT Pub. No.: WO2019/025673
PCT Pub. Date: Feb. 7, 2019

(65) Prior Publication Data
US 2020/0227940 A1 Jul. 16, 2020

(30) Foreign Application Priority Data

Jul. 31, 2017 (FR) ..................... 17 57323

(51) Int. Cl.
*H02J 13/00* (2006.01)
*G06Q 10/06* (2012.01)
*G06Q 50/06* (2012.01)

(52) U.S. Cl.
CPC ...... *H02J 13/00002* (2020.01); *G06Q 10/063* (2013.01); *G06Q 50/06* (2013.01); *H02J 2310/14* (2020.01)

(58) Field of Classification Search
CPC .... H02J 13/00002; H02J 2310/14; H02J 3/14; H02J 13/00004; H02J 13/00;
(Continued)

(56) References Cited

U.S. PATENT DOCUMENTS

| | | | | |
|---|---|---|---|---|
| 5,644,238 A | * | 7/1997 | Seifert | G01R 1/40 324/132 |
| 6,009,380 A | * | 12/1999 | Vecchio | G01H 5/00 367/87 |

(Continued)

FOREIGN PATENT DOCUMENTS

CN 103 793 788 5/2014

OTHER PUBLICATIONS

International Search Report dated Aug. 15, 2018.

*Primary Examiner* — Ramesh B Patel
(74) *Attorney, Agent, or Firm* — Ipsilon USA, LLP

(57) ABSTRACT

A method is provided for smoothing of an overall load curve. The method includes aggregation of a plurality of elementary load curves. In one example, the method makes provision to determine ($S_1$) a regulation period $d_i$ associated with the load i; determine and store each elementary load curve by obtaining ($S_2$) a plurality of measured consumption samples with a sampling period $T_{ech}$ that is a submultiple of each regulation period $d_i$. Starting from a reference time common to all of the loads, the method time-shifts ($S_3$) the operation of each load i by a random shift $\Delta t_i$ depending on the sampling period $T_{ech}$, on the regulation period $d_i$ determined for the load i and on a random integer value $N_i$ associated with the load i.

16 Claims, 5 Drawing Sheets

(58) Field of Classification Search
CPC .. G06Q 10/063; G06Q 50/06; Y02B 70/3225; Y02B 70/30; Y04S 20/242; Y04S 20/222
See application file for complete search history.

(56) References Cited

U.S. PATENT DOCUMENTS

| | | | | |
|---|---|---|---|---|
| 8,364,322 | B2* | 1/2013 | Oury | H02J 3/14 700/286 |
| 9,217,764 | B2* | 12/2015 | Heintz | H02J 13/00034 |
| 9,263,892 | B2* | 2/2016 | Lannez | H02J 3/12 |
| 9,563,215 | B2* | 2/2017 | Forbes, Jr. | G05F 1/66 |
| 2010/0030391 | A1* | 2/2010 | Oury | H02J 3/14 700/291 |
| 2013/0238156 | A1* | 9/2013 | Lannez | H02J 3/14 700/291 |
| 2013/0289903 | A1* | 10/2013 | Kazuno | G06Q 50/16 702/60 |
| 2014/0232372 | A1* | 8/2014 | Heintz | H02J 13/00028 324/76.47 |

* cited by examiner

SMOOTHING OF A LOAD CURVE COMPRISING AGGREGATION OF ELEMENTARY LOAD CURVES

RELATED APPLICATION

This application is a National Phase of PCT/FR2018/051179 filed on May 16, 2018, which in turn claims priority to French Patent Application No. 17 57323 filed no Jul. 31, 2017, the entirety of which are incorporated by reference.

BACKGROUND

Field of the Invention

The present invention generally relates to a method and a system for managing and/or monitoring energy consumption of a set of loads, able to determine an overall load curve comprising aggregation of a plurality of elementary load curves, each elementary load curve corresponding to a temporal variation of the consumption of a load belonging to the set and the operation of which is periodically regulated.

One field of application that is targeted quite particularly although not exclusively by the invention is that of managing and/or monitoring electricity consumption of a particularly high number of electrical appliances, for example domestic electrical appliances situated in the homes of a large number of consumers and connected to an electricity distribution grid.

Description of Related Art

It is conventional in such systems to install at least one electronic device on a plurality of sites (households, commercial buildings, communities, etc.), connected locally to at least one electrical appliance being monitored so as to be able to preferably continuously measure electricity consumption of this electrical appliance. A dedicated centralized platform, in the form of one or more servers, then obtains measured electricity consumption samples in real time that are communicated by each local electronic device of the system. The platform is thus able to determine the elementary load curves, that is to say the temporal variation of the relative consumption at each of the loads or electrical appliances being monitored, and deduce an overall load curve therefrom by aggregating these elementary load curves.

The Applicant proposes for example such a system for managing the consumption of a set consisting of a very high number of electrical appliances situated in the homes of a large number of users, wherein the various load curves that are obtained in particular make it possible to propose what is called a diffuse suppression service, by way of which it is possible to select, in real time, from the set of electrical appliances, a subset of electrical appliances to which the system, in particular the central platform, will send orders to temporarily stop operation so as to reduce the energy consumption of the set by a given setpoint value. A system of this type is for example in the application WO2008/017754 or in the application WO2012/172242. This system, while also being able, via stop and restart orders, to selectively modulate the supply of power to certain electrical appliances by analyzing the consumption of a large number of users, makes it possible to adapt the electricity consumption to the electricity production available at a given time.

In the system described above, the centralized platform obtains measured electricity consumption samples with a sampling period generally of the order of around ten minutes.

Furthermore, it is also desirable to be able to determine a more accurate overall load curve by reducing the sampling period. However, when using a much shorter sampling period, typically of the order of around ten seconds, the Applicant found itself confronted by situations in which the total load curve obtained after aggregating the elementary load curves was greatly affected by interference. FIG. 1 illustrates an example of a load curve $C_{TOT}$ obtained over a period of around one hour by taking measured electricity consumption samples with a sampling period $T_{ech}$ equal to 10 seconds, this load curve giving rise to large oscillations that were not visible using a sampling period of the order of around ten minutes, as shown by the trace in a bold, unbroken line superimposed on the load curve $C_{TOT}$.

The presence of these oscillations makes it much more difficult to accurately estimate the overall load curve. These oscillations may additionally, in the absence of oversizing, cause deterioration of the electrical lines or congestion.

Objects and Summary:

The purpose of the present invention is to propose a solution to this problem.

To this end, one subject of the invention is a method for smoothing an overall load curve comprising aggregation of a plurality of elementary load curves obtained by a system for managing and/or monitoring load consumption, each elementary load curve corresponding to a temporal variation of the consumption of a periodically regulated load i, said method comprising the following steps:

determining a regulation period $d_i$ associated with the corresponding load i;

determining and storing each elementary load curve by obtaining a plurality of measured consumption samples with a sampling period $T_{ech}$ that is a submultiple of each regulation period $d_i$;

starting from a reference time to common to all of the loads, time-shifting either the operation of each load i or at least part of each stored elementary load curve by a random shift $\Delta t_i$ depending on the sampling period $T_{ech}$, on the regulation period d determined for the load i and on a random integer value $N_i$ associated with the load i.

In addition to the main features that have just been mentioned in the above paragraph, the method according to the invention may have one or more additional features from among the following:

the step of time-shifting the operation of each load i may comprise, starting from said reference time to common to all of the loads, successively applying, for each load i, an order to stop operation of the load i and then an order to restart operation of the load i;

said order to restart operation of the load i is preferably applied at a random restart time given by the relationship $$t_{rep_i}^i = t_{rep_i}^0 + (t_{rep_i}^0 - t_0) N_i$$

Wherein $t_{rep_i}^0$ is a time satisfying the following two relationships:

$$(t_{rep_i}^0 - t_0) < d_i \text{ and } PGCD\left(\frac{(t_{rep_i}^0 - t_0)}{T_{ech}}; \frac{d_i}{T_{ech}}\right) = 1$$

PGCD being the greatest common divisor function, and said order to stop operation of the load i is applied at a stop time greater than or equal to the reference time to common to all of the loads and less than the random restart time $t_{rep}^i$;

said order to stop operation of the load i may be applied for all of the loads at the reference time $t_0$; as a variant, said order to stop operation of the load i is applied at a time chosen arbitrarily within the interval between the reference time to common to all of the loads and the random restart time $t_{rep}^i$;

the order to stop operation of the load i may be applied at a time chosen such that the random shift $\Delta t_i$ is identical for any load having the same regulation period $d_i$, for example set so as to be equal to the sampling period $T_{ech}$;

in another possible embodiment, the step of time-shifting part of each stored elementary load curve may comprise selecting said part of each curve comprising measured samples obtained starting from a first time that is identical for all of the loads, and shifting said selected part so as to make the start thereof coincide with a second time later than the first time;

as a variant, the step of time-shifting part of each stored elementary load curve comprises determining a first time simulating a stoppage and a second time, following the first time and simulating a restart, the selection of said part of each curve comprising measured samples obtained following a third time corresponding to the reference time plus a value corresponding to the regulation period of the load, shifting said selected part so as to make the start thereof coincide with said second time, and eliminating a curve portion situated between said first time and said second time;

said second time is preferably a random time given by the relationship $$t_{rep}^i = t_{rep_i}^0 + (t_{rep_i}^0 - t_0) N_i$$

wherein $t_{rep_i}^0$ is a time satisfying the following two relationships:

$$(t_{rep}^0 - t_0) < d_i \text{ and}$$

$$PGCD\left(\frac{(t_{rep_i}^0 - t_0)}{T_{ech}}; \frac{d_i}{T_{ech}}\right) = 1,$$

PGCD being the greatest common divisor function, and said first time is chosen so as to be greater than or equal to the reference time to common to all of the loads and less than the second time:

the regulation period $d_i$ associated with the load i may be determined by estimating said regulation period $d_i$ based on the associated load curve, or by setting said regulation period to a predetermined value;

the random integer value $N_i$ is preferably any integer greater than or equal to 0 and less than or equal to $$\frac{d_i}{T_{ech}} - 1.$$

Another subject of the invention is a system for managing and/or monitoring load consumption, able to determine an overall load curve comprising aggregation of a plurality of elementary load curves, each elementary load curve corresponding to a temporal variation of the consumption of a periodically regulated load i, said system having means able to smooth said load curve by applying the following steps:

determining a regulation period $d_i$ associated with the corresponding load i;

determining and storing each elementary load curve by obtaining a plurality of measured consumption samples with a sampling period $T_{ech}$ that is a submultiple of each regulation period $d_i$;

starting from a reference time to common to all of the loads, time-shifting either the operation of each load i or at least part of each stored elementary load curve by a random shift $\Delta t_i$ depending on the sampling period $T_{ech}$, on the regulation period $d_i$ determined for the load i and on a random integer value $N_i$ associated with the load i.

The system is for example a system able to manage and/or monitor electrical energy consumption of loads, comprising domestic electrical appliances situated in the homes of a plurality of consumers and connected to an electricity distribution grid.

It may have firstly, in the home of each consumer, at least one first electronic device able to measure the electricity consumption of at least one electrical appliance to which it is connected and to apply orders to stop operation and orders to restart operation to said at least one electrical appliance, and at least one second electronic communication device connected to the first electronic device, and secondly at least one central server able to communicate with said first device by way of the second electronic communication device in order to obtain said plurality of measured consumption samples with the sampling period $T_{ech}$ in real time.

The first and second electronic devices may be integrated into a single housing.

BRIEF DESCRIPTION OF THE DRAWINGS

The invention will be better understood upon reading the following description, given with reference to the appended figures, in which.

DETAILED DESCRIPTION

In the remainder of the disclosure, the invention will be described in the context of determining an overall load curve comprising aggregation of elementary load curves corresponding to the temporal evolution of the electricity consumption of a plurality of electrical appliances. It will however be seen that the principle of the invention may be applied generally to other types of consumed energy, as soon as the loads under consideration operate in all-or-nothing mode and the consumption follows a periodic pattern, for example when the loads under consideration are subject to periodic regulation.

Figure 1:
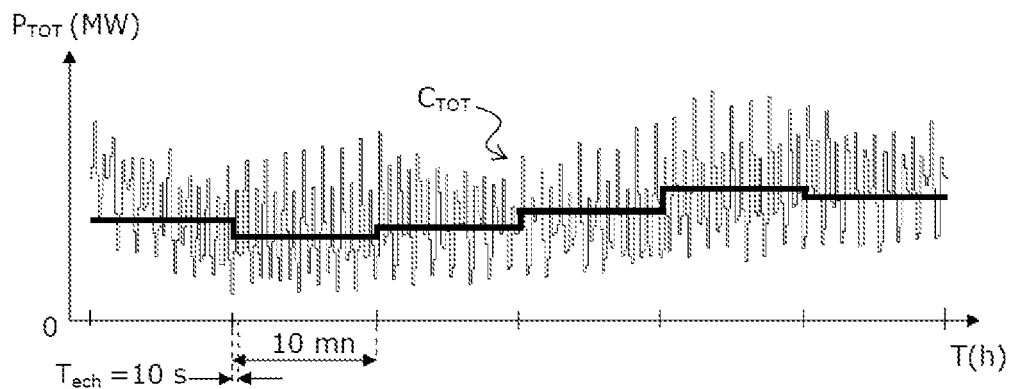
FIG. 1, already described above, gives an example of a load curve obtained using a system for aggregating elementary load curves from the prior art, operating with a sampling period reduced to 10 seconds.

As indicated above with reference to FIG. 1, the phenomenon of large oscillations for an overall load curve comprising the aggregation of a plurality of elementary load curves was observed by the Applicant when the sampling period for obtaining measured electricity consumption samples of the loads formed by electrical appliances situated in the homes of a large number of consumers, denoted $T_{ech}$ in the remainder of the disclosure, was reduced to a value of the order of around ten seconds. Tests and simulations have moreover shown that this phenomenon is amplified when at least some of the electrical appliances being monitored are subjected to simultaneous or virtually simultaneous restarts, as may be the case for example during a general outage in the electricity distribution grid.

Figure 2:
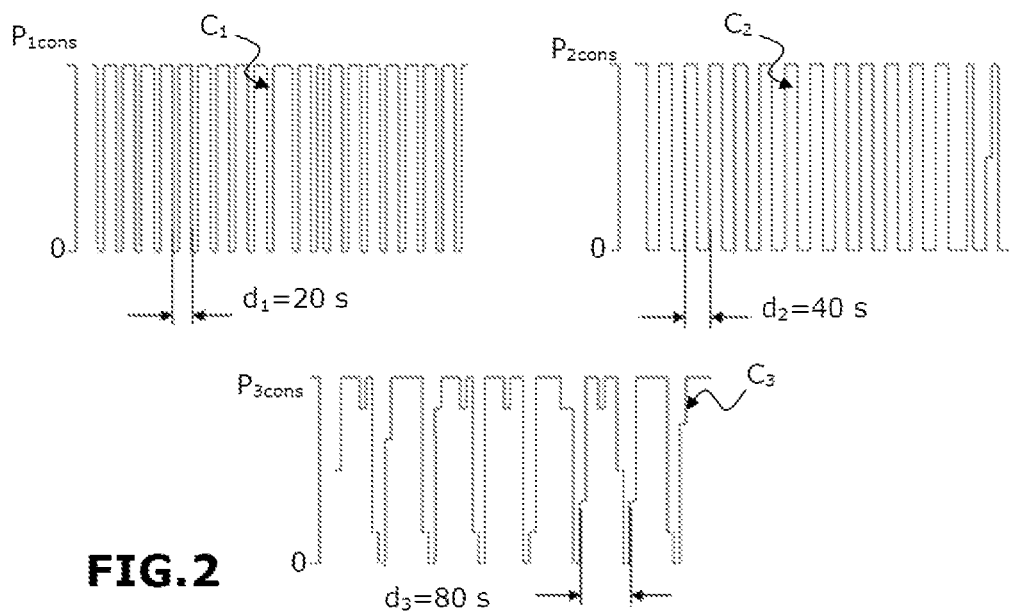
FIG. 2 illustrates three examples of load curves for three electric radiators.

More detailed analysis of this phenomenon made it possible to determine the cause more accurately therefrom by identifying the fact that, at the present time, a large number of domestic electrical appliances, such as radiators, air-conditioning systems, refrigerators, freezers, or halogen lighting systems, may have all-or-nothing operating states with periodic regulation. By way of example, FIG. 2 illustrates three load curves $C_1$, $C_2$, $C_3$ obtained for three commercially available radiators. These curves $C_1$, $C_2$, $C_3$, representative of the temporal variation of power, respectively $P_{1cons}$, $P_{2cons}$ and $P_{3cons}$, consumed by each of the radiators, clearly show the operation of each of the radiators in all-or-nothing mode, with regulation periods, respectively $d_1$, $d_2$ and $d_3$, and cycle durations that differ from one radiator to another. This periodic regulation behavior is in fact responsible for the large oscillations observed in an aggregated load curve, as a large number of electrical appliances will sometimes operate synchronously, in particular in situations in which these appliances are started simultaneously following a power outage or following a time instruction (tariff signals, clocks, etc.).

Figure 3:
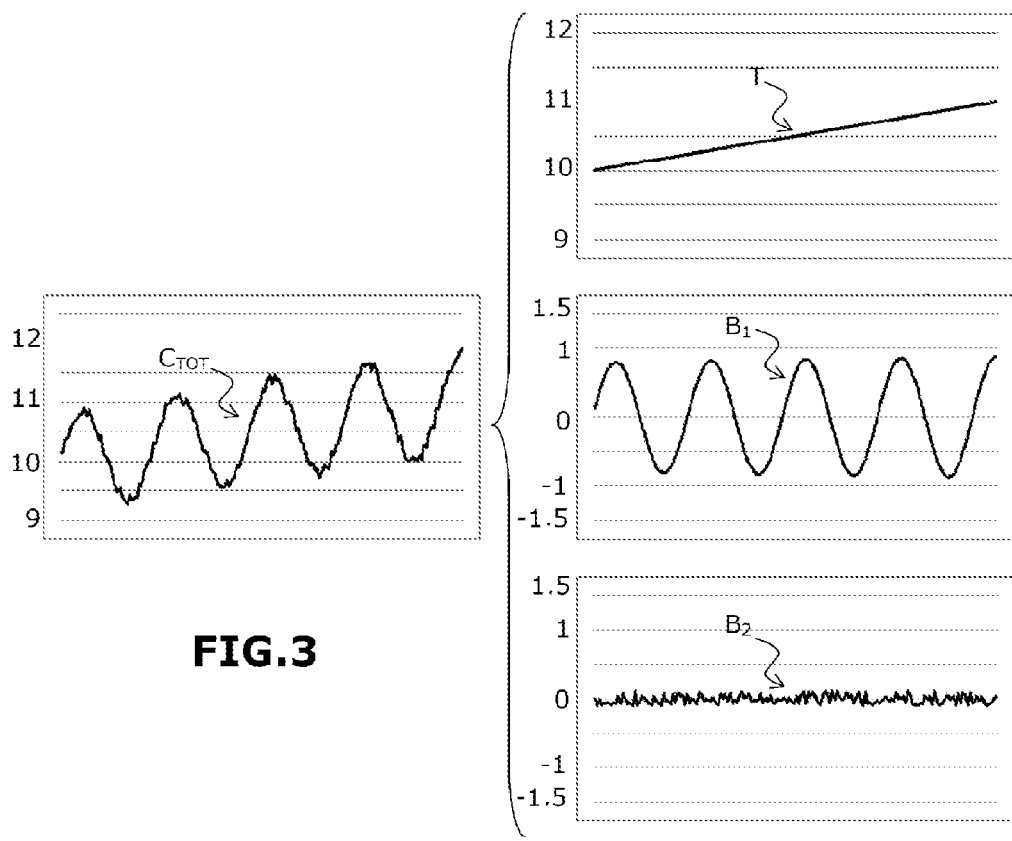
FIG. 3 gives a breakdown of a load curve portion obtained through aggregation into three signals.

It is thus possible to show that, starting from a set of periodically regulated electrical loads that are turned on at the same time, the aggregated load curve, such as the noise-impacted curved portion $C_{TOT}$ shown in FIG. 3, is able to be broken down into three signals:

an aperiodic trend T;

a first structured noise $B_1$ originating from the periodic regulation of the electrical loads; and a second unstructured low-amplitude noise $B_2$ able to be eliminated easily by conventional filtering.

In order to smooth the overall load curve as much as possible, that is to say in order to attenuate the first structured noise $B_1$ as much as possible, this noise resulting from synchronization of a large number of electrical loads i with the same periodic regulation with the regulation period denoted $d_i$ hereinafter, the present invention proposes, starting from a reference time to common to all of the loads, to force desynchronization of the loads by applying, for a load i, a random time shift $\Delta t_i$ depending on the sampling period $T_{ech}$, on the regulation period $d_i$ determined for the load i and on a random integer value $N_i$ associated with the load i.

The random time shift specific to each load may be applied in two ways, which will be described in detail hereinafter:

either by acting directly on the operation of the electrical loads;

or by performing digital processing of already obtained and stored load curve portions.

Time-Shifting the Operation of the Loads i:

The general principle of applying a random time shift to the operation of each load i starting from a reference time to common to all of the loads is implemented by successively applying, for each load i, an order to stop operation of the load i and then an order to restart operation of the load i.

The following notations and particular features are used hereinafter:

i represents a load whose consumption is being monitored and, when it is assigned, in the form of an index, to a given parameter, the parameter linked to the load;

$d_i$ is the regulation period associated with the load i;

$T_{ech}$ is the sampling period for obtaining measured consumption samples of the loads, $T_{ech}$ being a submultiple of each regulation period $d_i$, for example 10 seconds;

$t_0$ is the reference time common to all of the loads;

$t_{coup}^i$ is the stop time of a load i, that is to say the time at which a stop order is applied to a load i;

$t_{rep}^i$ is the restart time of a load i, that is to say the time at which a restart order is applied to a load i;

$\Delta t_i = t_{rep}^i - t_{coup}^i$ is the duration of the stoppage of the operation of a load i;

$t_{rep_i}^0$ is the first of the possible restart times;

$N_i$ is a random integer value that may be equal to 0.

The restart time $t_{rep}^i$ of a load i is a random time given by the relationship $$t_{rep}^i = t_{rep_i}^0 + (t_{rep_i}^0 - t_0) N_i \quad \text{(equation 1)}$$

wherein $t_{rep_i}^0$ (first of the possible restart times) satisfies the following two relationships:

$$(t_{rep_i}^0 - t_0) < d_i \text{ and } PGCD\left(\frac{(t_{rep_i}^0 - t_0)}{T_{ech}}; \frac{d_i}{T_{ech}}\right) = 1 \quad \text{(equation 2)}$$

PGCD being the greatest common divisor function.

The stop time $t_{coup}^i$ is for its part chosen arbitrarily within the interval $[t_0; t_{rep}^i[$, and may thus be different from one load to another.

The following are however preferably chosen:

a stop time $t_{coup}^i$ coinciding with the reference time $t_0$ if it is desired to give preference to ease of execution;

a stop time $t_{coup}^1$ preceding the restart time such that $\Delta t_i$ is identical for all of the loads if it is desired to harmonize the stop times. This duration may be equal to $T_{ech}$ if it is desired to give preference to the brevity of the interruption of the operation of the loads while at the same time maintaining the sampling frequency of the system.

The fastest process is that of choosing the integer value $N_i$ randomly within the limited interval of values $$\left[0; \frac{d_i}{T_{ech}} - 1\right].$$

In one purely illustrative example, if the common reference time $t_0$ is chosen to be every day at 03:00, a sampling period of 10 seconds is chosen and a stop time $\Delta t_i$ of 20 seconds is chosen, it is possible for example to choose a first stop time of 03:00:30 for an electrical load i with a regulation period equal to 60 seconds. This same load will have its operation stopped for 20 seconds starting, randomly, from 03:00:30 ($N_i$=0), from 03:01:20 ($N_i$=1), from 03:02:10 ($N_i$=2), from 03:03:00 ($N_i$=3), from 03:03:50 ($N_i$=4) or from 03:04:40 ($N_i$=5).

Figure 4:
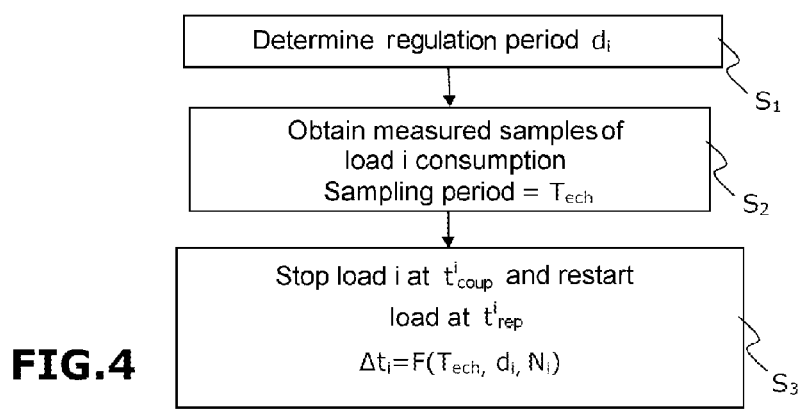
FIG. 4 schematically gives steps of a smoothing method according to one possible embodiment of the invention.

One example of a method for smoothing the overall load curve comprising the aggregation of a plurality of elementary load curves $C_i$ applying the above equations may be summarized by the steps shown schematically in FIG. 4. The steps are shown here in a certain order, but the two first steps may be swapped. In a first step $S_1$, a regulation period $d_i$ associated with a load i is determined. This determination may be performed through a priori knowledge of the type of loads being monitored and their associated regulation period. In a second step $S_2$, the elementary load curve of each load i is determined by obtaining a plurality of measured consumption samples with a single sampling period $T_{ech}$ that is a submultiple of each regulation period.

As a variant (not shown), steps $S_1$ and $S_2$ are swapped. It is thus possible to use the elementary load curves to estimate the associated regulation periods $d_i$, for example by measuring the average duration between two rising edges of the elementary load curve. If this measurement is not possible, for example if the load curve is zero (load not consuming at a given time), a predefined regulation period is assigned to the load under consideration. The last step $S_3$ corresponds to the phase of applying, to each load i, a stopping and restarting sequence so as to time-shift the operation of each load i by a random shift $\Delta t_i$ depending on the sampling period $T_{ech}$, on the regulation period $d_i$ and on the random integer value. The stop and restart times are defined by the group of equations 1 and 2. The loads that are likely, due to their common regulation period, to be synchronized before the time-shift processing according to the invention will be desynchronized. All of the elementary load curves obtained from measured consumption samples taken after this process will make it possible to obtain a smoothed aggregated curve from which it is possible to make a highly accurate estimation in real time. This process of acting on the operation of the loads is preferably repeated regularly, for example every day at the same time. As a variant, this process may be launched following prior detection that some loads have synchronized operation, this detection being performed for example by analysing the elementary load curves.

Figure 5:
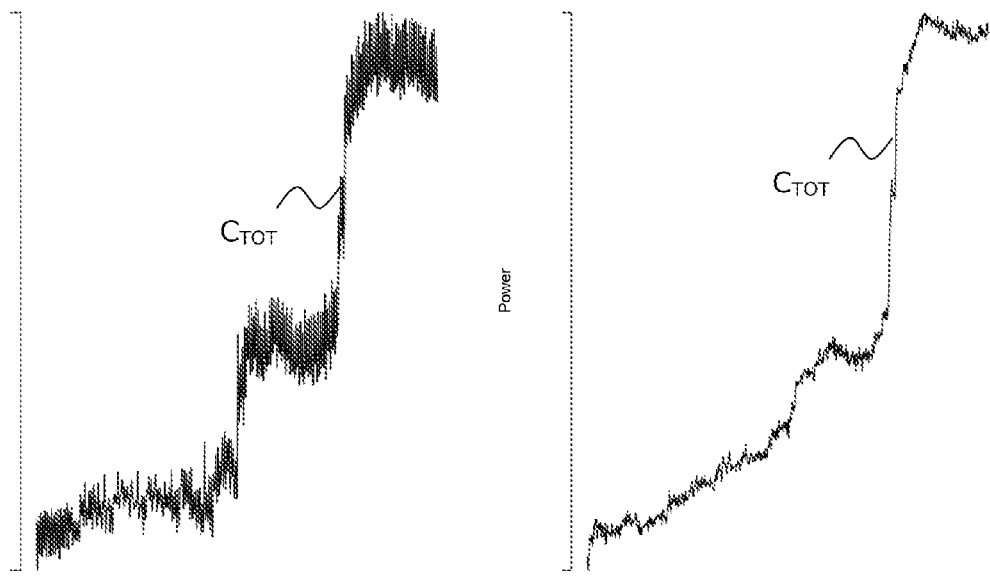
FIG. 5 gives a comparison of an aggregated load curve obtained before and after applying smoothing according to the invention.

FIG. 5 illustrates an example showing the obtained smoothing effect (right-hand part of the figure) on an overall load curve $C_T$ after applying the method according to FIG. 4. It is able to be observed that the effect of oscillations that is present before processing (left-hand part of FIG. 5) has been greatly reduced by virtue of the invention.

Digital Shifting of Load Curve Portions:

The time-shifting of the operation of the loads as described above of course assumes that the system is effectively able to act on the operation of the loads that it is monitoring by virtue of stop and restart orders. If this is not the case, it is equivalently possible to perform purely digital processing on the already obtained and stored elementary load curves. For this purpose, it is enough to simulate a stop order followed by a restart order for each load i by selecting the portion of each stored elementary load curve that is situated following a first time $t_1^i$ simulating the stop time, and by shifting this selected portion so that the start thereof coincides with a second time $t_2^i$ following the first time, simulating the restart time. In other words, it is possible to apply various digital processing operations in which the times $t_1^i$ and $t_2^i$ replace the times, respectively $t_{coup}^i$ and $t_{rep}^i$, described above. It is therefore possible to use equations 1 and 2 indicated above by imposing an identical stop time for all of the loads.

Figure 6:
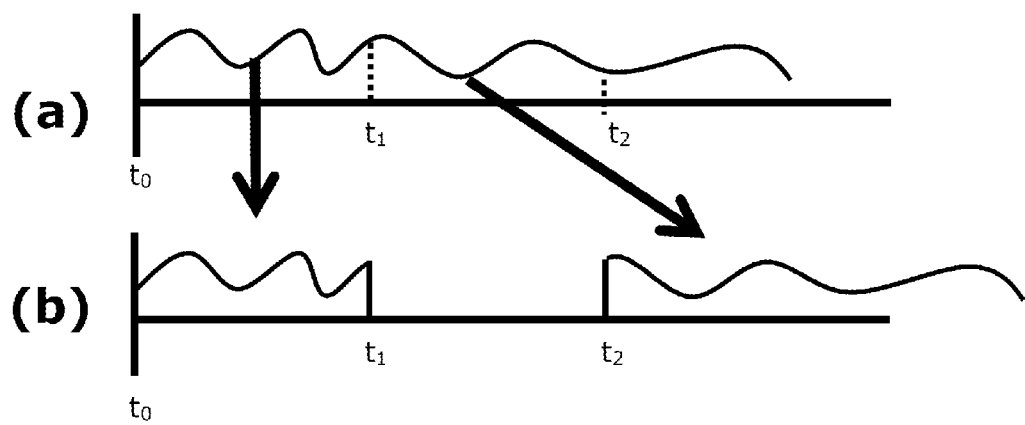
FIG. 6 illustrates the principle of a smoothing method according to another possible embodiment of the invention, using digital processing.

FIG. 6 schematically shows this digital processing with an example of an elementary load curve before processing in part (a) and the elementary load curve resulting from the processing in part (b).

The notation to is reused in this FIG. 6 to represent the reference time, already mentioned above, common to all of the loads. The portion of the load curve situated in part (a) between the reference time $t_0$ and the first time $t_1$ simulating the stop remains unchanged in part (b). By contrast, the portion of the load curve situated in part (a) following the first time $t_1$ simulating the stop has been shifted to the right in part (b) so that the start thereof coincides with the second time $t_2$ simulating the restart. The space of the curve, after processing, situated between the first time $t_1$ and the second time $t_2$ comprises samples with a value of zero.

Figure 7:
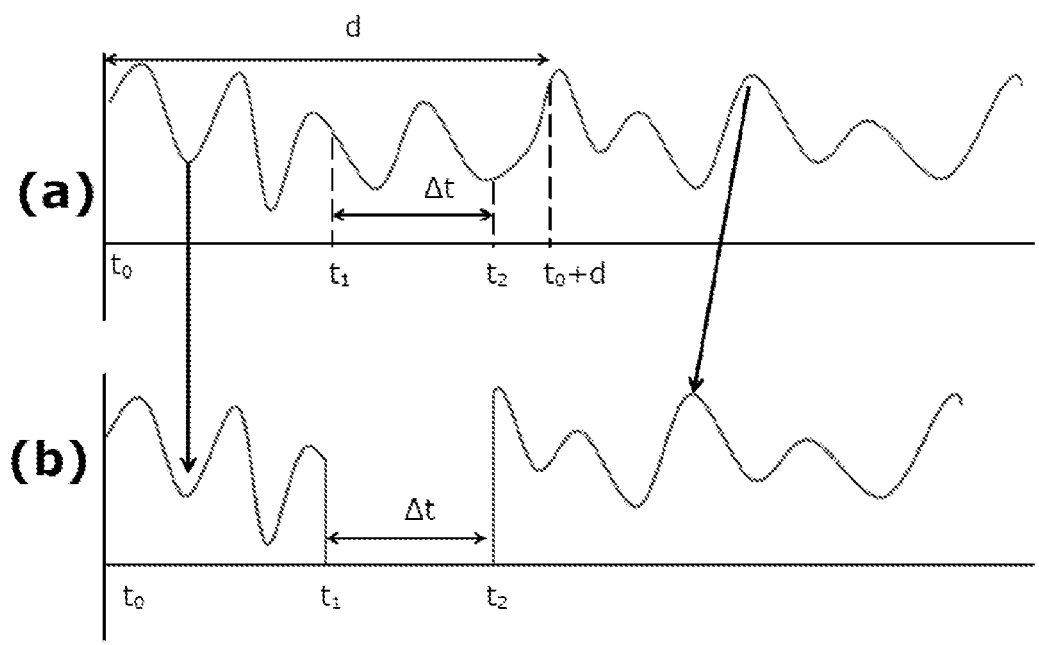
FIG. 7 illustrates a variant of a smoothing method using digital processing according to the invention.

One variant of a smoothing method using digital processing is illustrated in FIG. 7, still with an example of an elementary load curve before processing in part (a) and the elementary load curve resulting from the processing in part (b). In this case as well, the portion of the load curve situated in part (a) between the reference time $t_0$ and the first time $t_1$ simulating the stop remains unchanged in part (b). By contrast, the portion of the curve starting in part (a) at the time $t_0+d$, d being the regulation period of the load, is brought back in part (b) at the time $t_2$ simulating the restart. The portion of the load curve situated in part (a) between the first time $t_1$ simulating the stop and the second time $t_2$ has been eliminated in part (b) and replaced with samples with a value of zero. In contrast to the variant shown in FIG. 6, it is not necessary here to impose that the first time $t_1$ simulating the stop is common to all of the loads.

Preference should be given to the digital processing variant according to FIG. 6 if real-time processing is desired.

Preference should be given to the digital processing variant according to FIG. 7 if processing closer to that which would have been observed had there actually been stopping of operation of the load is desired.

Another digital processing possibility uses the fact that, as all of the elementary load curves are timestamped, starting from the common reference time $t_0$ it is possible to shift the timestamps of each load with regulation period $d_i$ by a value equal to $N_i T_{ech}$, where $N_i$ is an integer chosen randomly and uniformly from the set $$\left[\!\!\left[ 0, \frac{d}{T_{ech}} - 1 \right]\!\!\right].$$

Figure 8:
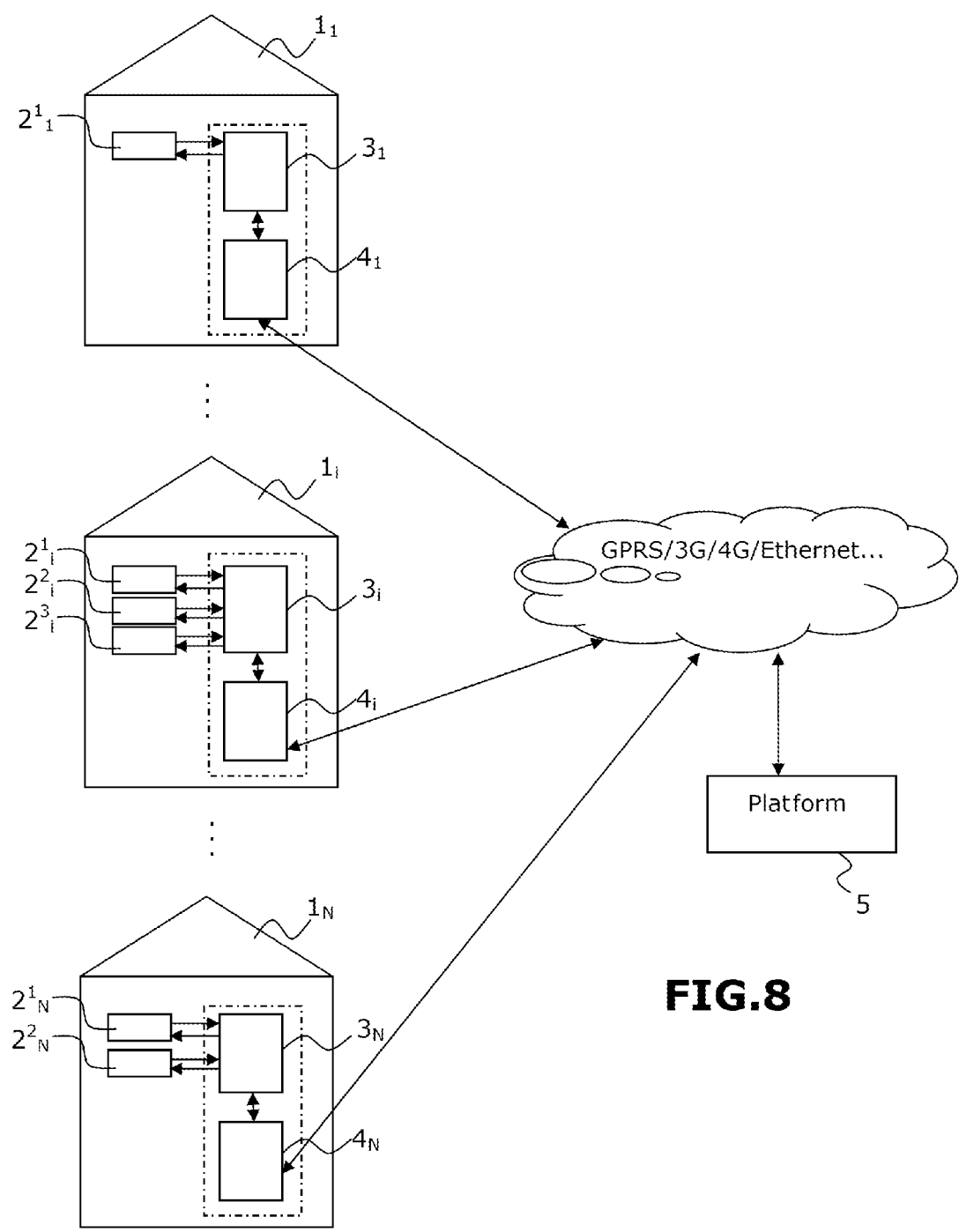
FIG. 8 schematically shows an exemplary architecture of a system for managing and/or monitoring load consumption, able to determine an overall load curve comprising aggregation of a plurality of elementary load curves, according to the invention.

FIG. 8 gives an exemplary architecture of a system for monitoring and/or managing electrical load consumption, able to implement a smoothing method according to the invention, according to one of the methods outlined above:

This figure shows various households $1_1, \ldots 1_i, \ldots 1_N$, each one being equipped with one or more electrical appliances being monitored, for example electrical heating systems, air-conditioning systems and the like, connected to an electricity distribution grid (not shown). By way of nonlimiting example, the household $1_1$ thus in this case has a single electrical appliance $2_i^1$, the household $1_i$ has three electrical appliances $2_i^1$, $2_i^2$ and $2_i^3$ and the household $1_N$ has two electrical appliances $2_N^1$ and $2_N^2$. The system furthermore has, in the household of each consumer:

at least one first electronic device $3_1, \ldots 3_i, \ldots 3_N$ electrically connected to the various electrical appliances being monitored in the household, able to measure, preferably continuously, the voltages and the currents consumed by these electrical appliances and to selectively send orders to stop operation and orders to restart operation to each of the electrical appliances being monitored in the household;
at least one second electronic communication device $4_1, \ldots 4_i, \ldots 4_N$ connected to the first device.

The system lastly has at least one central server 5 able to communicate with the first electronic device by way of the second electronic communication device in order to obtain a plurality of measured consumption samples with the sampling period $T_{ech}$ in real time. Obtaining the overall load curve, comprising aggregation of the elementary load curves, takes place in this central server.

The first electronic device, the second electronic device and the central server 5 correspond for example respectively to the modulator housing, to the control housing and to the remote external platform described in document WO2008/017754 in the name of the Applicant. In the present case, the consumption measurements performed by each modulator housing are sent, with the sampling period $T_{ech}$, to the external platform via the control housing. This periodic sending of the measurements is performed by way of a wireless communication modem integrated into the control housing of the system, the wireless communication modem making it possible to connect to the external platform through packet-switched telephony, such as GPRS, 3G or 4G. Alternatively, the connection to the central server may be made via an ADSL link. The control housing is preferably separate from the modulator housing, as shown in FIG. 8, and connected thereto via a wired link, preferably through powerline communication or PLC. For this purpose, each of the modulator and control housings is equipped with a PLC modem. The control housing may thus be connected to a plurality of modulator housings from which it collects the measurements in order to send them to the external platform. The control housing advantageously has a USB port that makes it possible to accept the connection of additional modules, such as short-range radio modems or temperature sensors. It is thus also possible to make provision for the measurements to be transmitted from the modulator housings via this radiofrequency channel.

As a variant, the first and second electronic devices may be integrated into a single housing.

The smoothing method according to the invention as presented above in these various variants may be implemented in many ways by the system of FIG. 8.

According to a first possible implementation, there may be provision for each second electronic device $4_1, \ldots 4_i, \ldots 4_N$ to be able to locally determine and store the elementary load curve of each electrical appliance to which it is connected, and to estimate the associated regulation period thereof.

Each second electronic device $4_1, \ldots 4_i, \ldots 4_N$ may then also be capable of time-shifting either a stored elementary load curve part or the operation of the electrical appliance by its corresponding random shift, according to the principles outlined above. For example, each second electronic device $4_1, \ldots 4_i, \ldots 4_N$ will time-shift the operation of an electrical appliance by its corresponding random shift by sending an order to stop operation and then an order to restart operation that are to be applied successively to this electrical appliance.

According to a second implementation, it is the central server 5 that is responsible for the task of locally determining and storing the elementary load curve of each electrical appliance and for estimating the associated regulation period thereof. The central server 5 may then time-shift the operation of an electrical appliance by its corresponding random shift by sending an order to stop operation and then an order to restart operation that are to be applied successively to this one electrical appliance by the first electronic device that is connected thereto. In this case, the sending of orders to stop operation and orders to restart operation transits and is relayed to the first electronic device by the second electronic communication device.

Although the invention has been described in the context of determining an overall load curve comprising aggregation of elementary load curves corresponding to the temporal evolution of the electricity consumption of a plurality of electrical appliances, the concept of load consumption corresponds to any physical phenomenon able to be measured by way of an extensive variable and able to be associated with a flow rate. The invention may therefore be applied to other types of consumed energy, such as gas, water, electrons or photons, as soon as the loads under consideration operate in all-or-nothing mode and the consumption follows a periodic pattern, for example when the loads under consideration are subject to periodic regulation.

The invention claimed is:

1. A method for smoothing an overall load curve having aggregation of a plurality of elementary load curves obtained by a system for managing and/or monitoring load consumption, each elementary load curve corresponding to a temporal variation of the consumption of a periodically regulated load i, said method comprising the following steps:
    determining a regulation period $d_i$ associated with the corresponding load i;
    determining and storing each elementary load curve by obtaining a plurality of measured consumption samples with a sampling period $T_{ech}$ that is a submultiple of each regulation period $d_i$;
    starting from a reference time to common to all of the loads, time-shifting either the operation of each load i or at least part of each stored elementary load curve by a random shift $\Delta t_i$ depending on the sampling period $T_{ech}$ on the regulation period $d_i$ determined for the load i and on a random integer value $N_i$ associated with the load i.

2. The method as claimed in claim 1, wherein the step of time-shifting the operation of each load i comprises, starting from said reference time to common to all of the loads, successively applying, for each load i, an order to stop operation of the load i and then an order to restart operation of the load i.

3. The method as claimed in claim 2, wherein said order to restart operation of the load i is applied at a random restart time given by the relationship $$t_{rep_i}^i = t_{rep_i}^0 + (t_{rep_i}^0 - t_0) N_i$$

wherein $t_{rep_i}^0$ is a time satisfying the following two relationships:

$$(t_{rep_i}^0 - t_0) < d_i \text{ and } PGCD\left(\frac{(t_{rep_i}^0 - t_0)}{T_{ech}}; \frac{d_i}{T_{ech}}\right) = 1,$$

PGCD being the greatest common divisor function,
and in that said order to stop operation of the load i is applied at a stop time greater than or equal to the reference time to common to all of the loads and less than the random restart time $t_{rep}^i$.

4. The method as claimed in claim 3, wherein said order to stop operation of the load i is applied for all of the loads at the reference time $t_0$.

5. The method as claimed in claim 3, wherein said order to stop operation of the load i is applied at a time chosen arbitrarily within the interval between the reference time to common to all of the loads and the random restart time $t_{rep}{}^i$.

6. The method as claimed in claim 5, wherein said order to stop operation of the load i is applied at a time chosen such that the random shift $\Delta t_i$ is identical for any load having the same regulation period $d_i$.

7. The method as claimed in claim 6, wherein the random shift $\Delta t_1$ is set so as to be equal to the sampling period $T_{ech}$.

8. The method as claimed in claim 1, wherein the step of time-shifting part of each stored elementary load curve comprises selecting said part of each curve comprising measured samples obtained starting from a first time that is identical for all of the loads, and shifting said selected part so as to make the start thereof coincide with a second time later than the first time.

9. The method as claimed in claim 1, wherein the step of time-shifting part of each stored elementary load curve comprises determining a first time simulating a stoppage and a second time, following the first time and simulating a restart, the selection of said part of each curve comprising measured samples obtained following a third time corresponding to the reference time plus a value corresponding to the regulation period of the load, shifting said selected part so as to make the start thereof coincide with said second time, and eliminating a curve portion situated between said first time and said second time.

10. The method as claimed in claim 8, wherein said second time is a random time given by the relationship $t_{rep}{}^i = t_{rep_i}{}^0 + (t_{rep_i}{}^0 - t_0)N_i$ Wherein $t_{rep_i}{}^0$ s a time satisfying the following two relationships:

$(t_{rep}^0 - t_0) < d_i$ and $PGCD\left(\frac{(t_{rep_i}^0 - t_0)}{T_{ech}}; \frac{d_i}{T_{ech}}\right) = 1,$ PGCD being the greatest common divisor function, and in that said first time is chosen so as to be greater than or equal to the reference time to common to all of the loads and less than the second time.

11. The method as claimed in claim 1, wherein the regulation period $d_i$ associated with the load i is determined by estimating said regulation period $d_i$ based on the associated load curve, or by setting said regulation period to a predetermined value.

12. The method as claimed in claim 1, wherein the random integer value $N_i$ is any integer greater than or equal to 0 and less than or equal to $$\frac{d_i}{T_{ech}} - 1.$$

13. A system for managing and/or monitoring load consumption, able to determine an overall load curve comprising aggregation of a plurality of elementary load curves, each elementary load curve corresponding to a temporal variation of the consumption of a periodically regulated load i, said system comprising:
  means for smoothing said load curve by applying the steps of:
    determining a regulation period $d_i$ associated with the corresponding load i;
    determining and storing each elementary load curve by obtaining a plurality of measured consumption samples with a sampling period $T_{ech}$ that is a submultiple of each regulation period $d_i$;
    starting from a reference time to common to all of the loads, time-shifting either the operation of each load i or at least part of each stored elementary load curve by a random shift $\Delta t_i$ depending on the sampling period $T_{ech}$, on the regulation period $d_i$ determined for the load i and on a random integer value $N_i$ associated with the load i.

14. The system as claimed in claim 13, for managing and/or monitoring electrical energy consumption of loads, comprising domestic electrical appliances situated in the homes of a plurality of consumers and connected to an electricity distribution grid.

15. The system as claimed in claim 14, wherein the system has firstly, in the home of each consumer ($1_1$, ... $1_i$, ... $1_N$), at least one first electronic device ($3_1$, ... $3_i$, ... $3_N$) able to measure the electricity consumption of at least one electrical appliance ($2_i^1$, $2_i^2$, $2_i^3$) to which it is connected and to apply orders to stop operation and orders to restart operation to said at least one electrical appliance ($2_i^1$, $2_i^2$) and at least one second electronic communication device ($4_1$, ... $4_i$, ... $4_N$) connected to the first electronic device, and secondly at least one central server (5) able to communicate with said first device by way of the second electronic communication device ($4_1$, ... $4_i$, ... $4_N$) in order to obtain said plurality of measured consumption samples with the sampling period $T_{ech}$ in real time.

16. The system as claimed in claim 15, wherein the first and second electronic devices are integrated into a single housing.

* * * * *